(12) United States Patent
Santos et al.

(10) Patent No.: US 8,522,227 B2
(45) Date of Patent: Aug. 27, 2013

(54) RUNTIME ACTIVATION AND VERSION SELECTION

(75) Inventors: Luiz F. Santos, Lynnwood, WA (US); Jesse D. Kaplan, Sammamish, WA (US); David S. Mortenson, Kirkland, WA (US); Richard E. Lander, Bellevue, WA (US); Simon J. Hall, Seattle, WA (US); Mark Miller, Woodinville, WA (US); Richard M. Byers, Bellevue, WA (US); Ladislav Prosek, Redmond, WA (US); Sean Selitrennikoff, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1038 days.

(21) Appl. No.: 12/545,881

(22) Filed: Aug. 24, 2009

(65) Prior Publication Data

US 2011/0047536 A1   Feb. 24, 2011

(51) Int. Cl.
*G06F 9/44* (2006.01)
(52) U.S. Cl.
USPC .......................................... 717/162; 719/331
(58) Field of Classification Search
USPC ............................................................ 717/162
See application file for complete search history.

(56) References Cited

U.S. PATENT DOCUMENTS

| | | | | |
|---|---|---|---|---|
| 6,332,168 B1* | 12/2001 | House et al. | ................. | 719/331 |
| 6,442,753 B1* | 8/2002 | Gerard et al. | ................. | 717/170 |
| 6,658,659 B2* | 12/2003 | Hiller et al. | ................. | 717/170 |
| 6,871,344 B2* | 3/2005 | Grier et al. | ................. | 717/162 |
| 7,055,146 B1* | 5/2006 | Durr et al. | ................. | 717/162 |
| 7,117,371 B1* | 10/2006 | Parthasarathy et al. | ........ | 713/187 |
| 7,287,259 B2* | 10/2007 | Grier et al. | ................. | 719/331 |
| 7,694,277 B2* | 4/2010 | Yuknewicz et al. | ........... | 717/121 |
| 7,735,059 B2* | 6/2010 | Darst et al. | ................. | 717/106 |
| 7,752,618 B2* | 7/2010 | Moles et al. | ................. | 717/173 |
| 7,814,471 B2* | 10/2010 | Jodh | ............................. | 717/163 |
| 7,930,273 B1* | 4/2011 | Clark et al. | ................. | 707/638 |
| 8,060,856 B2* | 11/2011 | Besbris et al. | ................ | 717/106 |
| 2002/0019972 A1* | 2/2002 | Grier et al. | ........................ | 717/3 |
| 2002/0100017 A1* | 7/2002 | Grier et al. | .................... | 717/120 |
| 2004/0230967 A1* | 11/2004 | Yuknewicz et al. | ........... | 717/170 |

(Continued)

OTHER PUBLICATIONS

Pratschner S., "Customizing the Microsoft .NET Framework Common Language Runtime" Published year: 2005, retrieved from <http://flylib.com/books/en/4.331.1.34/1/> total pp. 12.*

(Continued)

*Primary Examiner* — Dong Wong
*Assistant Examiner* — Marina Lee
(74) *Attorney, Agent, or Firm* — Rau Patents, LLC (57) ABSTRACT

A runtime activation system uses a set of policies designed to provide a balance between backwards compatibility and ease of migrating existing (non side-by-side aware) applications to new runtime versions. The system chooses the runtime version to activate when an application runs or when a runtime application programming interface is invoked based on the set of policies. The system implements these policies by consulting compatibility data associated with the application indicating the intent of the author and level of side-by-side support provided by the application and/or global configuration data. Based on the compatibility data, the system chooses policies that are right in the most common cases, and easy to modify in less common cases. Thus, the runtime activation system allows applications to be flexibly configured to handle new runtime versions in a manner determined by the application author, a system administrator, or others.

19 Claims, 6 Drawing Sheets

(56) References Cited

U.S. PATENT DOCUMENTS

| | | | |
|---|---|---|---|
| 2005/0060725 A1* | 3/2005 | D'Souza et al. | 719/331 |
| 2005/0102649 A1 | 5/2005 | Hogg et al. | |
| 2005/0166196 A1* | 7/2005 | Grier et al. | 717/162 |
| 2006/0161563 A1* | 7/2006 | Besbris et al. | 707/100 |
| 2006/0168579 A1* | 7/2006 | Besbris et al. | 717/170 |
| 2006/0174252 A1* | 8/2006 | Besbris et al. | 719/330 |
| 2006/0179430 A1* | 8/2006 | Besbris et al. | 717/162 |
| 2006/0179440 A1* | 8/2006 | Besbris et al. | 719/328 |
| 2006/0236317 A1 | 10/2006 | Wetherly et al. | |
| 2006/0277539 A1* | 12/2006 | Amarasinghe et al. | 717/168 |
| 2006/0282817 A1* | 12/2006 | Darst et al. | 717/106 |
| 2009/0013010 A1* | 1/2009 | Fang et al. | 707/203 |
| 2009/0024986 A1 | 1/2009 | Meijer et al. | |
| 2010/0037206 A1* | 2/2010 | Larimore et al. | 717/109 |
| 2010/0037235 A1* | 2/2010 | Larimore et al. | 719/312 |
| 2011/0047536 A1* | 2/2011 | Santos et al. | 717/170 |

OTHER PUBLICATIONS

Dorman, Scott, "CLR 4.0: In Process Side-by-Side CLR Hosting", Retrieved at <<http://geekswithblogs.net/sdorman/archive/2008/11/10/c1r-4.0-in-process-side-by-side-clr-hosting.aspx>>, May 15, 2009, pp. 1-5.

Broman, David, "New stuff in Profiling API for upcoming CLR 4.0", Retrieved at << http://blogs.msdn.com/davbr/archive/2008/11/10/new-stuff-in-profiling-api-for-upcoming-clr-4-0.aspx>>, May 15, 2009, pp. 1-5.

Fischer, Donald, "Red Hat Enterprise Linux 4 Application Compatibility", Retrieved at <<http://www.redhat.com/f/pdf/rhel4/AppCompat.pdf>>, Feb. 2005, pp. 1-12.

"Java Runtime Environment Version Selection in the New Java Plug-In Technology", Retrieved at <<https://jdk6.dev.java.net/plugin2/version-selection/>>, May 15, 2009, pp. 1-6.

"Preparation, Verification, and Deployment of Applications", Retrieved at <<http://download.microsoft.com/download/3/6/7/3676d9fe-3979-45cf-a6a8-c8d26122bcb5/Prepdeploy.doc>>, White Paper, Nov. 2002, pp. 26.

"C++ runtime environments (-AA and -AP) on HP-UX", Retrieved at <<http://h21007.www2.hp.com/portal/site/dspp/menuitem.863c3e4cbcdc3f3515b49c108973a801?ciid=eb08b3f1eee02110-b3f1eee02110275d6e10RCRD>>, May 15, 2009, pp. 1-9.

* cited by examiner

RUNTIME ACTIVATION AND VERSION SELECTION

BACKGROUND

Software developers often build software applications on top of a "runtime" library such as Microsoft's Common Language Runtime (CLR), or runtime libraries like Microsoft's C-Language Runtime (CRT). Runtimes may provide common functions such as application startup logic, as well as class libraries for handling common programming challenges. For example, the CLR contains class libraries that implement common data structures (e.g., linked lists, hash tables, and so forth), as well as common functionality, such as garbage collection. By using a runtime, an application relieves the application's author from implementing well-understood programming logic so that the author can focus on logic specific to the problem the author is trying to solve.

Applications have grown complex, often allowing extendibility through third-party software plug-ins. For example, a word processing application may invoke third-party software modules that add new items to toolbars and menus, or provide other extended functionality to the word processing application. As the application evolves and the application author updates the application, it is common for the application to be built to run with one runtime version while the application's author would like to continue supporting older plug-ins built using an earlier runtime version. Similarly, the plug-ins may evolve faster than the hosting application, and the plug-ins may rely on a newer version of a runtime while the application relies on an older version of the runtime. A newer runtime version may introduce intentional and unintentional changes in behavior that can negatively affect components that operated correctly on the previous version. Further complicating such applications is that managed execution environments, such as Microsoft's CLR, may allow a mix of managed and native (non-managed) application code to run in the same process, each having its own runtime considerations and expectations.

Managed code is computer program code that executes under the management of a virtual machine or runtime, unlike unmanaged code, which is executed directly by the computer's central processing unit (CPU). Programs in any programming language can, in principle, be compiled into either managed or unmanaged code. In practice, however, each programming language is typically compiled into one type. For example, the Java programming language is almost always compiled into managed code, although there are Java compilers that can generate unmanaged code (such as the GNU Compiler for Java). By contrast, Microsoft's Visual C++ development environment can produce both managed code (running under the .NET CLR) or unmanaged code.

Designers of runtimes may initially design the runtime so that a particular process can only load a single version of that runtime, and application authors often build applications with the same assumption. When the runtime author updates and distributes a newer version of the runtime, older applications are sometimes forced to execute using the new runtime potentially leading to backwards compatibility problems. For example, if a user deploys an application compiled against runtime version 1 to a computer that has runtime version 2 installed, the application may run using the installed version, which can be subtly incompatible with the application and result in a variety of problems during execution. Solving this problem by maintaining total backwards compatibility is not feasible for any complex and evolving runtime, so such runtimes may evolve to support multiple versions loaded simultaneously into the same process at once so that application code can use the runtime version for which it was designed.

Another problem is that when evolving a runtime to support multiple versions "side-by-side" in the same process, it is often desirable to continue running applications correctly that were designed for a previous version of the runtime that did not support multiple runtime versions in a single application process. The runtime may include functions that query information about the application execution environment from which it is desirable to hide new versions of the runtime. At the same time, the runtime author wants to make it easy to update an application to run against a new version of the runtime (e.g., for compatibility testing or just updating). These two goals are contradictory. These considerations can be translated into the following question: how can an application designed to have only one runtime in its process execute in a multiple runtime process with no impact, while also making it easy to move applications forward to a new version of the runtime?

A previous simple solution to this problem is to keep applications tightly coupled to the version of the runtime they were designed for, so that all requests to a runtime are implicitly targeted at a specific version with no sharing across versions. This is the solution taken by the Microsoft CRT. The biggest downsides are that application authors cannot move applications between versions without recompiling and applications designed for different runtime versions are limited in how they can share information.

SUMMARY

A runtime activation system is described herein that uses a set of policies designed to provide a balance between backwards compatibility and ease of migrating existing (non side-by-side aware) applications to new runtime versions. The system includes an activation shim component that chooses the runtime version to activate when an application runs or when a runtime application programming interface is invoked. The activation shim carries out a set of policies to determine which runtime to activate for a particular application or module within a process. The system implements these policies by consulting compatibility data associated with the application indicating the intent of the author and level of side-by-side support provided by the application and/or global configuration data. Based on the compatibility data, the system chooses policies that are right in the most common cases, and easy to modify in less common cases. Thus, the runtime activation system allows applications to be flexibly configured to handle new runtime versions and side-by-side runtime versions in a manner determined by the application author, a system administrator, or others.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A runtime activation system is described herein that uses a set of policies designed to provide a balance between backwards compatibility and ease of migrating existing (non side-by-side aware) applications to new runtime versions. Backwards compatibility in the case of a runtime may include preferring to run applications or plug-ins on the runtime for which they were built, so that the results are the same as experienced when the application was built and tested by its author. The system includes an activation shim component that chooses the runtime version to activate when an application runs or when a runtime application programming interface (API) is invoked. The activation shim carries out a set of policies to determine which runtime to activate for a particular application or module within a process. Under one set of policies: 1) applications designed for a previous version of the runtime are unaffected when a new version of the runtime is installed on the machine, 2) applications designed without consideration of side-by-side runtimes can be migrated (with or without recompiling) to new versions of the runtime without any special consideration of side-by-side runtimes, 3) applications designed without consideration of side-by-side runtimes can be easily updated to be side-by-side aware, and 4) plug-ins designed for new versions of the runtime can be injected into processes not explicitly designed or configured for side-by-side runtimes. The system implements these policies by consulting compatibility data associated with the application indicating the intent of the author and level of side-by-side support provided by the application and/or global configuration data. The compatibility data may specify, for example policies that produce correct program behavior in the most common cases and are easy to modify in less common cases. Thus, the runtime activation system allows applications to be flexibly configured to handle new runtime versions and side-by-side runtime versions in a manner determined by the application author, a system administrator, or others.

The policy used by the runtime activation system is a set of dynamic rules that describes how applications activate one or many runtimes in processes associated with the applications. Having the latest runtime installed should not affect applications and plug-ins built using previous versions of the runtime. The policy provides rules in order to avoid unpredictable behavior in old applications and plug-ins. For legacy applications, the policy may provide a rule that applications bind to one of the runtimes against which the applications were tested. If no such runtime is installed or available, the policy may specify that the system display a dialog message inviting the user to install a compatible runtime or the system may install the compatible runtime on the user's behalf. As referred to herein, legacy applications and runtimes refer to those that are not side-by-side aware, while current/non-legacy runtimes and applications are those built to run correctly with side-by-side aware runtimes in a process. However, those of ordinary skill in the art will recognize that the techniques described herein may also be applied successfully to other incompatibilities that occur when a runtime is updated from one version to the next. The system may be configured to prefer to preserve the behavior of legacy applications, keeping the existing behavior, and preferring execution against the runtime for which the legacy applications were built.

In some embodiments, the runtime activation system determines the activation policy based upon the host application type (native vs. managed) and the level of information available in the application. For native applications, the system may cause plug-ins to bind to the runtime against which the plug-ins were compiled and to apply legacy execution rules only for execution against legacy (non side-by-side) runtimes. Plug-ins may include Component Object Model (COM) objects or other pluggable software building blocks. For managed applications, the system may determine whether the application was compiled against a runtime that is side-by-side aware, and if so cause any legacy plug-ins to bind to that runtime by default. However, the system provides a configuration setting that can be used by the application author to indicate that the application has been migrated from the legacy API such that the system can enable support for side-by-side activation with older runtimes. If the application was compiled against any legacy runtime, then new plug-ins bind against the side-by-side aware runtime for which they were designed. Alternately, the system may choose to provide increased compatibility for legacy plug-ins, and run them in the runtime for which they were built by default (even for managed plug-ins compiled against a runtime that is side-by-side aware). In such cases, the system provides a configuration setting that can be used by the application or plug-in author to indicate that the software relies on the legacy API.

In some embodiments, the runtime activation system provides results from legacy APIs based on the host application type. The legacy API may include a one-per-process resource that constrains the activation itself. For APIs with results affected by activating multiple side-by-side runtimes in a process, the system may determine the results to return from the APIs based on the policies described herein. For example, legacy APIs may expect only one runtime in a process, and if the API, for example, is asked to report the current runtime version, the API determines which loaded runtime's version to report. It is desirable for legacy APIs to preserve their original returned results. Thus, the system may determine that for native hosts any legacy APIs will return results related to legacy runtimes by default. For example, if a legacy API returns new runtime results, then any multiple runtime capabilities may be turned-off. For managed applications, by default any legacy API will return results related to the runtime already loaded in the process. The previous example describes a policy that prefers ease of migration. A policy that prefers backwards compatibility might instead bind the legacy APIs to the highest legacy version. This balance can be modified through configuration settings described herein.

Figure 1:
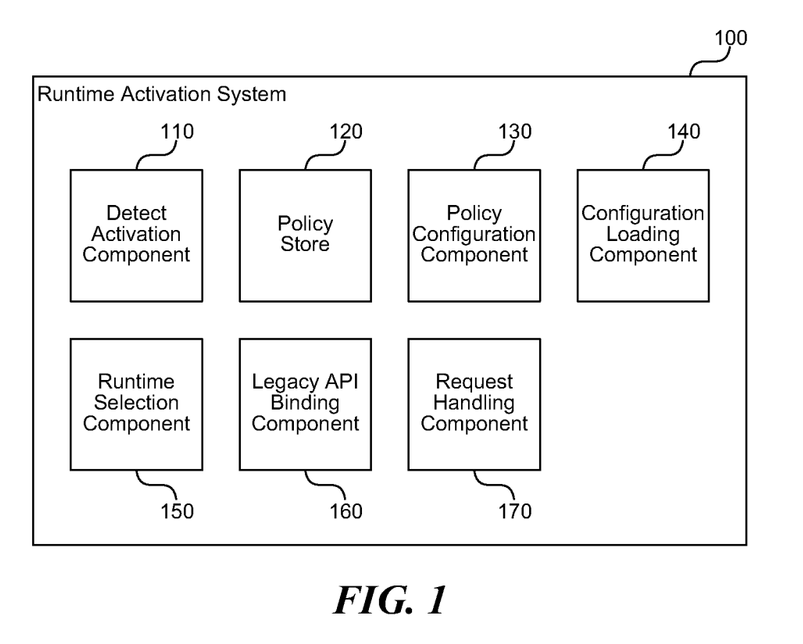
FIG. 1 is a block diagram that illustrates components of the runtime activation system.

FIG. 1 is a block diagram that illustrates components of the runtime activation system. The system 100 includes a detect activation component 110, a policy store 120, a policy configuration component 130, a configuration loading component 140, a runtime selection component 150, a legacy API binding component 160, and a request handling component 170. Some components are optional and the system 100 may not include each of these components in each embodiment.

For example, in some embodiments the system 100 does not provide a separate policy configuration component 130. Each of these components is described in further detail herein.

The detect activation component 110 detects an activity that invokes a runtime. For example, the activity may be a function call or loading of a software module or assembly for execution. The detect activation component 110 may take the form of an activation shim that a software module invokes to select and activate a runtime. The detect activation component 110 allows the runtime activation system 100 to insert the logic described herein into the activation process. For example, upon detection of a request for runtime activation by the component 110, the system may consult one or more activation policies, select an appropriate runtime version to activate, and activate the selected runtime version to handle the request that caused the activation.

The policy store 120 stores one or more policies that determine a runtime version among a plurality of runtime versions to invoke in response to a particular runtime activation request. The policy store may include a configuration file associated with a computer system and individual configuration files associated with software modules. In some embodiments, the author of a software module can express the author's confidence in the compatibility of the software module with one or more runtime versions as well as the author's preference for rolling forward to new runtime versions. The author may place this information in a manifest or other configuration information associated with the software module (e.g., flags in a Portable Executable (PE) file). The information may be added manually by the author or automatically, such as by a compiler or other development tools.

The policy configuration component 130 allows an administrator or other user to modify policies stored in the policy store 120. For example, an administrator may determine that a particular runtime version contains vulnerabilities such that the administrator does not want to allow the particular runtime version to run on a computer system. In response, the administrator may use the policy configuration component 130 to set a policy that excludes the errant runtime version from running, even when a particular software module requests that version of the runtime.

The configuration loading component 140 accesses policy information associated with the runtime on a computer system. For example, Microsoft NET uses a configuration file that may be extended with the process element in the following XML code to define the permitted runtimes for assemblies running on the computer system.

```
<configuration>
    <startup>
        <process>
            <permittedRuntimes mode="inclusive"|"exclusive">
                <runtime version="X.Y.Z}"/>
            </permittedRuntimes>
            <rollForward enabled="true"|"false"/>
        </process>
    </startup>
</configuration>
```

The permittedRuntimes element describes the set of runtimes that can be loaded into a process. The element may have a mode property that specifies whether the list is inclusive or exclusive. The rollForward element specifies whether the system will use the compatibility policy when the system cannot find an exact match within the set of runtimes supported by the application. By default the value is false, but when set to true and the desired runtime is not found, the system rolls forward to the closest available match among the permitted and installed runtimes.

The runtime selection component 150 selects a runtime to activate in response to a runtime activation request based on policy and other information. For example, when component 150 receives a request to activate a runtime (e.g., via the detect activation component 110), the runtime selection component 150 may select a runtime based on factors such as policy stored in the policy store 120 and accessed through the configuration loading component 140, configuration information associated with an executable hosting the software module initiating the request, the host type of the executable (e.g., managed or native), whether the request specifies a particular runtime version (e.g., an API that receives a runtime version string), and so forth. The runtime selection component 150 may also determine whether a particular host executable was built to be aware of and compatible with side-by-side execution of multiple runtime versions in a process.

The legacy API binding component 160 is a subcomponent of the runtime selection component 150 that determines a runtime to activate when a legacy API is invoked that is dependent on a particular runtime version. Based on configuration policy, the component 160 determines whether to activate a side-by-side aware runtime or a legacy runtime version. The decision of which runtime to activate may balance backwards compatibility with ease of migration to a new runtime version based on configured policy or other factors described herein.

The request handling component 170 activates the runtime selected by the runtime selection component 150 and forwards the runtime activation request to the selected runtime for handling. For example, the runtime activation request may have resulted from invoking a legacy hosting API that dynamically binds to a runtime. The runtime activation system 100 detects the activation request through the detect activation component 110 selects an appropriate runtime to handle the request (e.g., based on policy and/or other factors described herein) using the runtime selection component 150, activates the selected runtime, and forwards the API call to the activated runtime to respond to the request. The caller that invoked the legacy hosting API receives the results of the API call from the selected runtime.

The computing device on which the runtime activation system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The runtime activation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
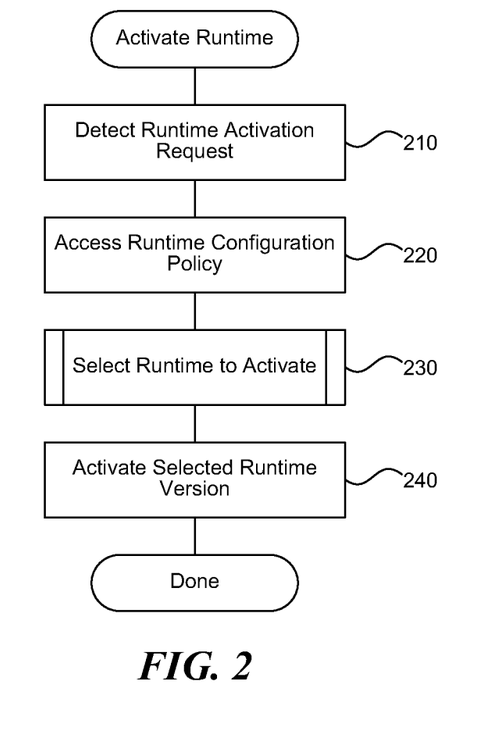
FIG. 2 is a flow diagram that illustrates the processing of the runtime selection component of the runtime activation system to activate a runtime among a plurality of runtime versions, in one embodiment.

FIG. 2 is a flow diagram that illustrates the processing of the runtime selection component of the runtime activation system to activate a runtime among a plurality of runtime versions, in one embodiment. Beginning in block 210, the component detects a runtime activation request. For example, the runtime activation system may include an activation shim that is loaded along with a software module and that detects requests to activate runtimes. The request to activate a runtime may occur in response to loading of a software module (e.g., static binding) or in response to calling a runtime-dependent API (e.g., dynamic binding).

Continuing in block 220, the component accesses a runtime configuration policy that includes one or more criteria for selecting a runtime version among the plurality of runtime versions to activate. For example, the runtime configuration policy may specify that information associated with a software module from which the activation request originated governs which runtime version to select. Alternatively or additionally, the runtime configuration policy may specify criteria to select a runtime version for a plug-in software module based on information about a host software module hosting the plug-in software module. For example, if the host is bound to a side-by-side aware runtime version, then the policy may limit plug-ins to the same runtime version. As another example, if the host is bound to a legacy runtime version, then the policy may allow plug-ins to use either a side-by-side aware or legacy runtime version.

Continuing in block 230, the component selects a runtime version to activate in response to the runtime activation request based on the runtime configuration policy. The component may include information about runtime versions installed on a computer system running the component. For example, if the policy specifies that a particular activation should use version two or higher of a runtime, and the computer system has versions one and two installed, then the component may select version two. Alternatively or additionally, under some circumstances the component may request that the user install a particular version of the runtime (e.g., version four in the previous example). Continuing in block 240, the component activates the selected version of the runtime. Activation may include loading one or more software modules associated with the runtime (e.g., mscoree.dll for Microsoft .NET or msvcrt.dll for the Microsoft CRT) and invoking one or more initialization functions of the runtime. In situations where the component dynamically loads the runtime in response to an API call, the component may also forward an original API request that caused the activation to the loaded runtime for response to the caller of the API. After block 240, these steps conclude.

Figure 3:
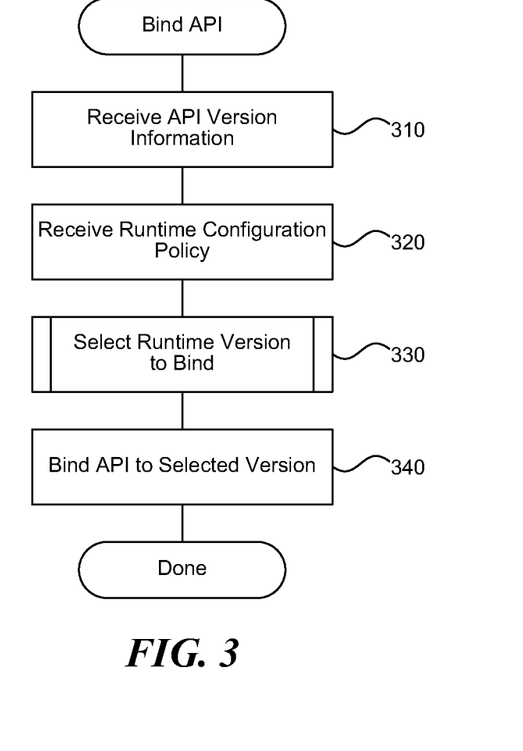
FIG. 3 is a flow diagram that illustrates the processing of the legacy API binding component to bind a runtime to respond to an API request, in one embodiment.

FIG. 3 is a flow diagram that illustrates the processing of the legacy API binding component to bind a runtime to respond to an API request, in one embodiment. Beginning in block 310, the component receives API version information. In some cases, an API may only exist in a particular version of a runtime or in versions prior to a particular version. In such cases, an invocation of the API is an implicit request to activate a version of the runtime that included the API. In other cases, an API may receive a runtime version as a parameter of the API (e.g., as a string or numeric representation of a version or threshold version). In such cases, the received version is an explicit request to activate a particular runtime version.

Continuing in block 320, the component receives a runtime configuration policy that specifies one or more criteria for selecting a runtime version to which to bind the API request. For example, the policy may specify that the API request be bound to a version of the runtime for which a software executable that invokes the API is built. As another example, the policy may specify a runtime version to which to bind legacy APIs. Continuing in block 330, the component selects a runtime version to which to bind an API based on the API version information and runtime configuration policy. For example, if the API version information specifies an available runtime version, then the component may select that runtime version. Alternatively or additionally, if the runtime configuration policy specifies a configuration override that specifies a particular runtime version, then the component may select that runtime version. The component may also determine which runtime versions are installed on the computer system executing the component to select an appropriate runtime version.

Continuing in block 340, the component binds the API to the selected runtime version and invokes the API to respond to the API request. The component may bind the API by loading a software module associated with the runtime and having a host proxy calls to the appropriate runtime (e.g., call into the runtime on the plug-ins behalf and return the results) or mimic the runtime's behavior. As another example, the component may maintain a function table and set one or more function pointers associated with legacy APIs to point to API implementations within the loaded runtime. In some embodiments, the APIs may return results based on the API version information and runtime configuration policy information. For example, if a particular software executable designed for an older runtime is incapable of handling results based on newer runtime information, then the API may only return results containing older runtime information, so that the software executable will continue to operate as designed even after the newer runtime version is installed. After block 340, these steps conclude.

Figure 4:
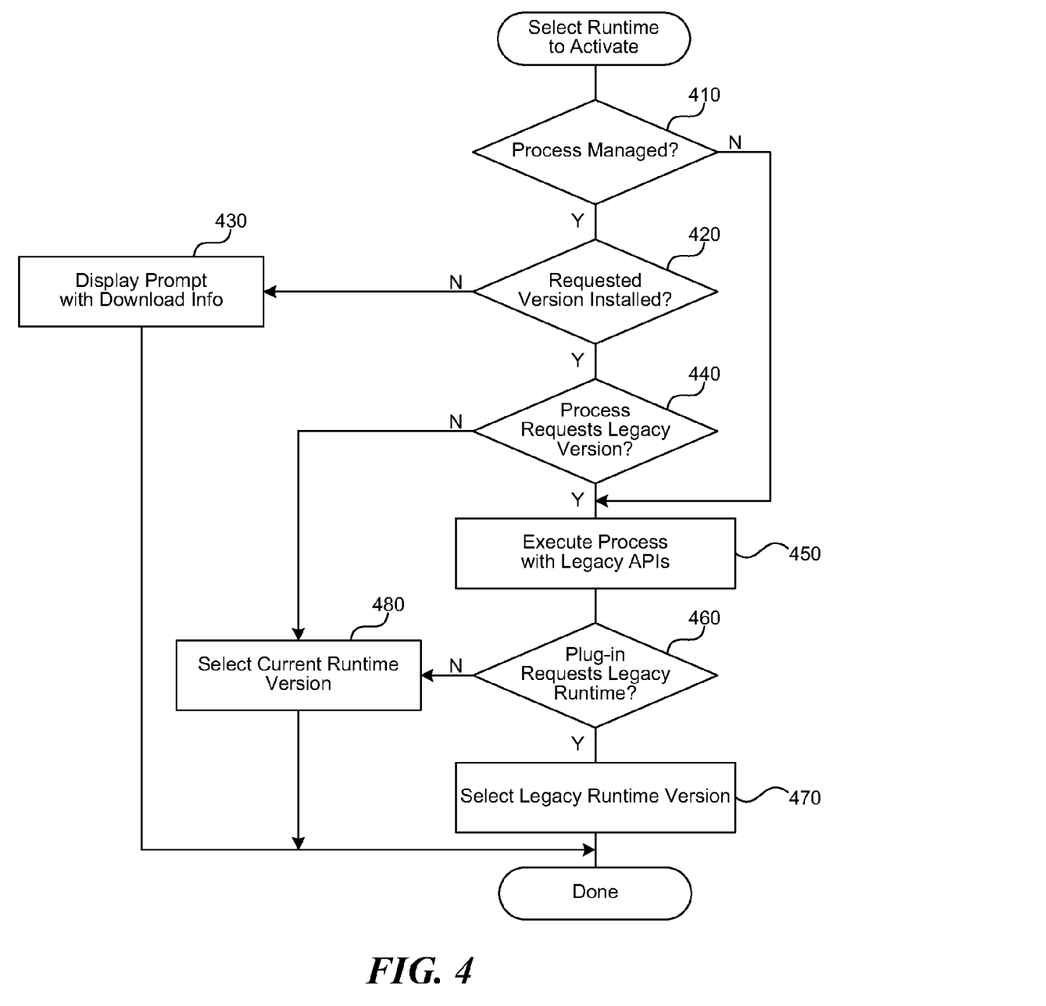
FIG. 4 is a flow diagram that illustrates the processing of the runtime selection component to select a runtime version based on policy, in one embodiment.

FIG. 4 is a flow diagram that illustrates the processing of the runtime selection component to select a runtime version based on policy, in one embodiment. For example, these steps may be invoked to implement the policy described with reference to block 230 of FIG. 2. Beginning in decision block 410, the component determines whether a hosting executable process is based on a managed or native software module and if managed continues in block 420, else the component jumps to block 450. The component may or may not handle native and managed processes differently based on expectations of software developers for modules of each type of process and based on the ability of the module to operate correctly in an environment with multiple runtime versions active in the hosting process.

Continuing in decision block 420, if a version of the runtime requested by the hosting executable process is not installed, then the component continues at block 430, else the component continues at block 440. In block 430, the component displays a prompt or other user interface to inform a user to install the requested runtime version. For example, the prompt may include download instructions for obtaining the requested runtime version. After displaying the prompt, the component completes. The user can re-run the hosting executable process after downloading the requested runtime version. Continuing in decision block 440, if the hosting executable process requests a legacy runtime version, then the component continues at block 450, else the component jumps to block 480. Typically, a software module includes information identifying a runtime version for which the software module is designed. For example, a Portable Executable (PE) file may include information about the runtime used to build the file in the PE header. As another example, a manifest may include configuration information that specifies a runtime version for which the software module is designed.

Continuing in block 450, the component executes the process, which requested the legacy runtime version, with legacy API implementations. The component may activate the current runtime version but may inform the runtime that APIs should return results similar to a legacy version of the runtime. During the execution of the hosting executable process, the process may load and invoke one or more plug-in modules, such as third party extensions that add functionality to the hosting executable process. Continuing in decision block 460, if a plug-in requests a legacy runtime, then the component continues in block 470, else the component continues in block 480. In block 470, the component selects a legacy runtime version to bind to the plug-in. In block 480, the component selects a current runtime version to bind to the plug-in. Note that in this particular embodiment, if the hosting executable is running using a current (e.g., side-by-side aware) version of the runtime, then legacy plug-ins also run against that version of the runtime, regardless of the version requested by the plug-ins. Non-legacy plug-ins will run using the side-by-side aware version of the runtime against which they were built or designed. Other outcomes can be configured using the configuration policy described herein. After block 480, these steps conclude.

Figure 5:
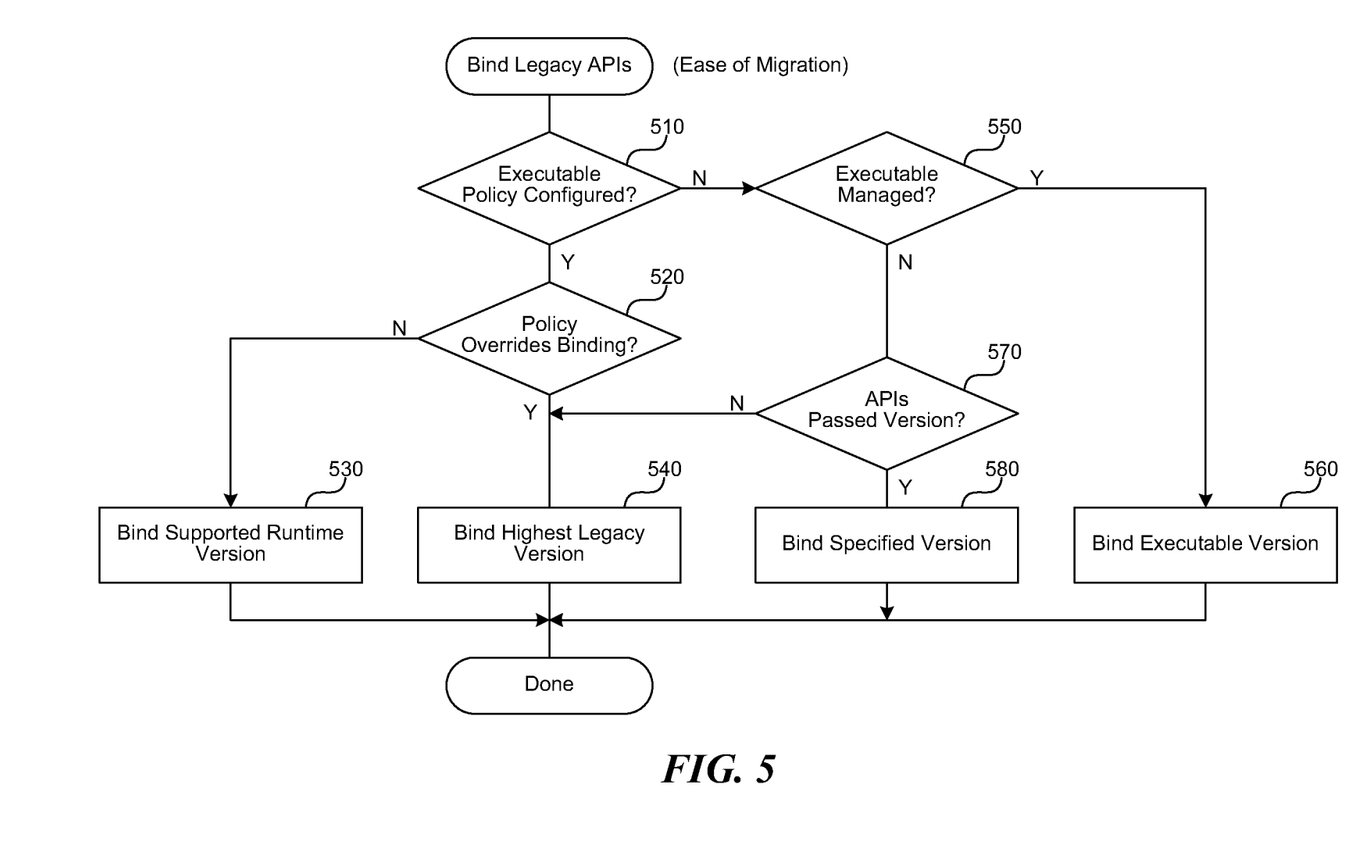
FIG. 5 is a flow diagram that illustrates processing of the legacy API binding component to bind APIs in accordance with a policy that prefers ease of migration, in one embodiment.
Figure 6:
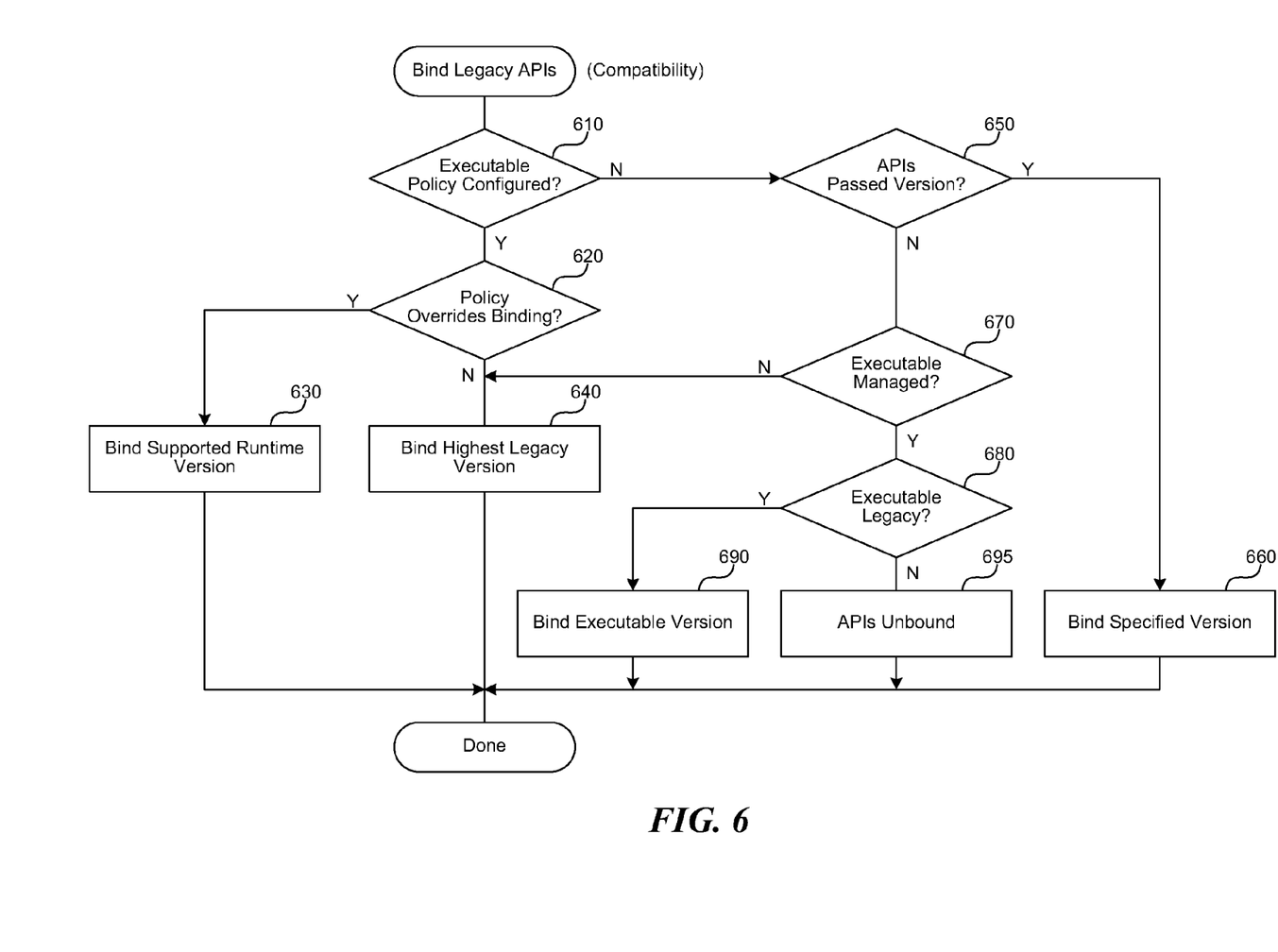
FIG. 6 is a flow diagram that illustrates processing of the legacy API binding component to bind APIs in accordance with a policy that prefers backwards compatibility, in one embodiment.

FIG. 5 is a flow diagram that illustrates processing of the legacy API binding component to bind APIs in accordance with a policy that prefers ease of migration, in one embodiment. FIGS. 5 and 6 illustrate the flexibility of the system to implement different policies with different runtime versions selected based on configuration determined by an administrator or other user. Beginning in decision block 510, the component determines whether the executable contains runtime configuration information, and if so continues at block 520, else the component continues at block 550. For example, the executable may include a manifest or other configuration store that specifies which runtimes the executable is designed to use. Continuing in decision block 520, if the configuration overrides legacy API binding, then the component continues at block 540, else the component continues at block 530. Continuing in block 530, the component binds the legacy API to a supported runtime version of the executable. In block 540, the component binds the legacy API to the highest installed legacy runtime version.

Continuing in decision block 550, if the executable is a managed executable, then the component continues at block 560, else the component continues at block 570. In block 560, the component binds the legacy API to the runtime version associated with the executable. Continuing in decision block 570, if the legacy APIs are passed a version number, then the component continues at block 580, else the component jumps to block 540. Continuing in block 580, the component binds the legacy APIs to the version passed to the APIs. Thus, as illustrated by these steps the runtime activation system can be configured to alter the binding of legacy APIs based on a variety of criteria. After block 580, these steps conclude.

FIG. 6 is a flow diagram that illustrates processing of the legacy API binding component to bind APIs in accordance with a policy that prefers backwards compatibility, in one embodiment. Beginning in decision block 610, the component determines whether the executable contains runtime configuration information, and if so continues at block 620, else the component continues at block 650. For example, the executable may include a manifest or other configuration store that specifies which runtimes the executable is designed to use. Continuing in decision block 620, if the configuration overrides legacy API binding, then the component continues at block 630, else the component continues at block 640. Continuing in block 630, the component binds the legacy API to a supported runtime version of the executable. In block 640, the component binds the legacy API to the highest installed legacy runtime version.

Continuing in decision block 650, if the legacy APIs are passed a version number, then the component continues at block 660, else the component continues at block 670. In block 660, the component binds the legacy API to the runtime version passed to the APIs. Continuing in decision block 670, if the executable is a managed executable, then the component continues at block 680, else the component jumps to block 640. Continuing in decision block 680, if the executable was built for a legacy runtime version, then the component continues at block 690, else the component continues at block 695. In block 690, the component binds the legacy APIs to the version associated with the executable. In block 695, the component leaves the legacy APIs unbound. After block 695, these steps conclude.

In some embodiments, the runtime activation system provides a high compatibility policy so that an application, component, or plug-in executes using the runtime for which it was built. The system may provide an interface (e.g., ICLRMetaHostPolicy) through which an application can obtain information about the policy and can select the high compatibility policy. In addition, the system may allow this policy to be modified via a configuration setting.

In some embodiments, the runtime activation system treats communication between modules in a process using different runtime versions similar to cross-process communication. For example, for cross-process communication the runtime may perform marshaling of calls and data that is not typically performed between components in the same process. Although treating the communication in this manner may hurt performance, the added isolation boundary helps to ensure compatibility between the components.

From the foregoing, it will be appreciated that specific embodiments of the runtime activation system have been described herein for purposes of illustration, but that various modifications may be made without deviating from the spirit and scope of the invention. For example, although legacy versions of the runtime are described herein as those that do not support side-by-side runtimes, those of ordinary skill in the art will appreciate that other variations between runtime versions can cause runtime incompatibilities for which the system described herein provides a configurable solution. Accordingly, the invention is not limited except as by the appended claims.

We claim:

1. computer-implemented method for activating a runtime among a plurality of runtime versions, the method comprising:
   detecting a runtime activation request comprising detecting the request to activate a runtime in response to calling a runtime-dependent application programming interface (API);
   accessing a runtime configuration policy that includes one or more criteria for selecting a runtime version to activate among the plurality of runtime versions and to which to bind the API request;

selecting a runtime version to activate in response to the runtime activation request based on the accessed runtime configuration policy and information associated with the request by considering if the requested runtime version is available and if the runtime configuration policy specifies a configuration override;

binding the API to the selected runtime version and invoking the API to respond to the API request; and activating the selected version of the runtime, wherein the preceding steps are performed by at least one processor.

2. The method of claim 1 wherein detecting a runtime activation request comprises loading an activation shim when a software module is loaded, wherein the activation shim detects requests from the software module to activate a runtime.

3. The method of claim 1 wherein detecting a runtime activation request comprises detecting the request to activate a runtime in response to loading of a software module.

4. The method of claim 1 wherein accessing a runtime configuration policy comprises accessing information associated with a software module from which the activation request originated.

5. The method of claim 1 wherein accessing a runtime configuration policy comprises accessing global configuration information associated with a runtime version.

6. The method of claim 1 wherein the accessed runtime configuration policy specifies one or more criteria to select a runtime version for a plug-in software module based on information about a host software module hosting the plug-in software module.

7. The method of claim 6 wherein the runtime configuration policy specifies that if the host is bound to a side-by-side aware runtime version, then non-side-by-side aware plug-ins are bound to a non-side-by-side aware runtime version and side-by-side aware plug-ins are bound to a side-by-side aware runtime version.

8. The method of claim 6 wherein the runtime configuration policy specifies that if the host is bound to a legacy runtime version, then the policy allows plug-ins to select between a current runtime version and a legacy runtime version.

9. The method of claim 1 wherein selecting a runtime version to activate comprises determining versions of the runtime installed on a computer system.

10. The method of claim 1 wherein selecting a runtime version to activate comprises prompting a user to install a particular version of the runtime or automatically installing the runtime version on the user's behalf.

11. The method of claim 1 wherein activating the selected version of the runtime comprises loading one or more software modules associated with the runtime and invoking one or more initialization functions of the runtime.

12. A computer system for runtime activation version selection for software that uses a runtime, the system comprising:

a processor and memory configured to execute software instructions;

a detect activation component configured to detect an activity that invokes a runtime and to receive API version information, wherein the API receives a runtime version as a parameter of the API requesting to activate a specific runtime version;

a policy store configured to store one or more policies that determine a runtime version among a plurality of runtime versions to invoke in response to a particular runtime activation request, the one or more policies specifying one or more criteria for selection a runtime version to which to bind the API request;

a configuration loading component configured to access policy information associated with a runtime version installed on the computer system;

a runtime selection component configured to select a runtime to activate in response to a runtime activation request based on policy information and to bind the API based on the received API version information and received runtime configuration policy by considering if the requested runtime version is available and if the runtime configuration policy specifies a configuration override; and a request handling component configured to activate the selected runtime version and forward the runtime activation request to the selected runtime for handling and further configured to bind the API to the selected runtime.

13. The system of claim 12 wherein the detect activation component is further configured to, upon detecting a request for runtime activation, consult one or more activation policies, select an appropriate runtime version to activate, and activate the selected runtime version to handle the request that caused the activation.

14. The system of claim 12 wherein the policy store comprises a configuration file associated with the computer system and individual configuration files associated with one or more software modules, wherein the individual configuration files store a software module author's preference for which runtime version to activate with a given software module.

15. The system of claim 12 further comprising a policy configuration component configured to allow a user to modify policies stored in the policy store.

16. The system of claim 12 wherein the runtime selection component is further configured to, upon receiving a request to activate a runtime, select a runtime based on at least one of a policy stored in the policy store, configuration information associated with an executable hosting a software module initiating the request, a host type of the executable, and an indication of whether the request specifies a particular runtime version.

17. The system of claim 12 wherein the runtime selection component is further configured to determine whether a particular host executable was built to be aware of and compatible with side-by-side execution of multiple runtime versions in a process.

18. The system of claim 12 further comprising a legacy API binding component configured to determine a runtime to activate when a legacy API is invoked that is dependent on a particular runtime version.

19. A computer-readable storage medium comprising instructions for controlling a computer system to bind a runtime to respond to an application programming interface (API) request, wherein the instructions, when executed, cause a processor to perform actions comprising:

receiving API version information, wherein the API receives a runtime version as a parameter of the API requesting to activate a specific runtime version;

receiving a runtime configuration policy that specifies one or more criteria for selecting a runtime version to which to bind the API request;

selecting a runtime version to which to bind the API based on the received API version information and received runtime configuration policy by considering if the requested runtime version is available and if the runtime configuration policy specifies a configuration override; and binding the API to the selected runtime version and invoking the API to respond to the API request.

* * * * *